US009141806B2

(12) United States Patent
Siman

(10) Patent No.: US 9,141,806 B2
(45) Date of Patent: Sep. 22, 2015

(54) MINING SOURCE CODE FOR VIOLATIONS OF PROGRAMMING RULES

(75) Inventor: Maty Siman, Tel Aviv (IL)

(73) Assignee: CHECKMARX LTD., Tel Aviv (IL)

(*) Notice: Subject to any disclaimer, the term of this patent is extended or adjusted under 35 U.S.C. 154(b) by 131 days.

(21) Appl. No.: 13/811,271

(22) PCT Filed: Aug. 22, 2011

(86) PCT No.: PCT/IB2011/053671
§ 371 (c)(1),
(2), (4) Date: Jan. 20, 2013

(87) PCT Pub. No.: WO2012/025865
PCT Pub. Date: Mar. 1, 2012

(65) Prior Publication Data
US 2013/0239219 A1    Sep. 12, 2013

Related U.S. Application Data

(60) Provisional application No. 61/376,260, filed on Aug. 24, 2010.

(51) Int. Cl.
G06F 21/00    (2013.01)
G06F 21/57    (2013.01)
G06F 21/60    (2013.01)
G06F 21/10    (2013.01)
G06F 21/56    (2013.01)

(52) U.S. Cl.
CPC .............. *G06F 21/577* (2013.01); *G06F 21/10* (2013.01); *G06F 21/563* (2013.01); *G06F 21/60* (2013.01)

(58) Field of Classification Search
CPC ..... G06F 21/577; G06F 21/563; G06F 21/10; G06F 21/60
USPC ................................................. 726/22, 23, 25
See application file for complete search history.

(56) References Cited

U.S. PATENT DOCUMENTS

| 5,107,418 A | 4/1992 | Cramer et al. |
| 5,485,616 A | 1/1996 | Burke et al. |
| 5,586,328 A | 12/1996 | Caron et al. |
| 5,586,330 A | 12/1996 | Knudsen et al. |
| 5,701,489 A | 12/1997 | Bates et al. |
| 5,742,811 A * | 4/1998 | Agrawal et al. ........... 1/1 |

(Continued)

FOREIGN PATENT DOCUMENTS

| CA | 2200812 A1 | 9/1998 |
| JP | 2003050722 A | 2/2003 |
| WO | 2005121953 A | 12/2005 |

OTHER PUBLICATIONS

European Application # 11819494.3 Search Report dated Apr. 4, 2014.

(Continued)

*Primary Examiner* — Sarah Su
(74) *Attorney, Agent, or Firm* — D. Kligler I.P. Services Ltd.

(57) ABSTRACT

A method for software code analysis includes automatically processing a body of software source code (23) by a computer (22) in order to identify a group of sequences of instructions that are characterized by a common pattern. A sequence within the group containing a deviation from a norm of the common pattern is found and reported as a potential vulnerability in the software source code.

36 Claims, 3 Drawing Sheets

(56) References Cited

U.S. PATENT DOCUMENTS

| | | | |
|---|---|---|---|
| 5,778,233 A | 7/1998 | Besaw et al. | |
| 5,790,858 A | 8/1998 | Vogel | |
| 5,875,334 A | 2/1999 | Chow et al. | |
| 5,881,290 A | 3/1999 | Ansari et al. | |
| 5,978,588 A | 11/1999 | Wallace | |
| 6,442,748 B1 | 8/2002 | Bowman-Amuah | |
| 7,210,133 B2 | 4/2007 | Souloglou et al. | |
| 7,284,274 B1 | 10/2007 | Walls et al. | |
| 7,363,616 B2 * | 4/2008 | Kalyanaraman | 717/124 |
| 7,392,545 B1 | 6/2008 | Weber et al. | |
| 7,447,666 B2 * | 11/2008 | Wang | 706/45 |
| 7,565,631 B1 | 7/2009 | Banerjee et al. | |
| 7,860,842 B2 * | 12/2010 | Bronnikov et al. | 707/690 |
| 7,971,193 B2 | 6/2011 | Li et al. | |
| 8,510,237 B2 * | 8/2013 | Cascaval et al. | 706/12 |
| 8,881,288 B1 * | 11/2014 | Levy et al. | 726/25 |
| 8,949,271 B2 * | 2/2015 | Kocher et al. | 707/776 |
| 2002/0178281 A1 | 11/2002 | Aizenbud-Reshef et al. | |
| 2003/0056192 A1 | 3/2003 | Burgess | |
| 2004/0255277 A1 | 12/2004 | Berg et al. | |
| 2005/0015752 A1 | 1/2005 | Alpern et al. | |
| 2005/0198626 A1 | 9/2005 | Kielstra et al. | |
| 2005/0204344 A1 | 9/2005 | Shinomi | |
| 2005/0273861 A1 | 12/2005 | Chess et al. | |
| 2006/0070048 A1 | 3/2006 | Li et al. | |
| 2006/0085858 A1 | 4/2006 | Noel et al. | |
| 2006/0253841 A1 | 11/2006 | Rioux | |
| 2006/0282453 A1 | 12/2006 | Tjong et al. | |
| 2007/0006170 A1 | 1/2007 | Hasse et al. | |
| 2007/0083933 A1 | 4/2007 | Venkatapathy et al. | |
| 2007/0143759 A1 * | 6/2007 | Ozgur et al. | 718/102 |
| 2007/0294281 A1 * | 12/2007 | Ward et al. | 707/102 |
| 2009/0187992 A1 | 7/2009 | Poston | |
| 2009/0254572 A1 | 10/2009 | Redlich et al. | |
| 2010/0011441 A1 * | 1/2010 | Christodorescu et al. | 726/24 |
| 2010/0043072 A1 * | 2/2010 | Rothwell | 726/24 |
| 2010/0050260 A1 * | 2/2010 | Nakakoji et al. | 726/23 |
| 2010/0083240 A1 | 4/2010 | Siman | |
| 2010/0088770 A1 * | 4/2010 | Yerushalmi et al. | 726/26 |
| 2010/0229239 A1 * | 9/2010 | Rozenberg et al. | 726/24 |
| 2010/0251210 A1 * | 9/2010 | Amaral et al. | 717/105 |
| 2010/0279708 A1 * | 11/2010 | Lidsrom et al. | 455/456.1 |
| 2011/0004631 A1 * | 1/2011 | Inokuchi et al. | 707/798 |
| 2012/0240185 A1 * | 9/2012 | Kapoor et al. | 726/1 |
| 2013/0167241 A1 | 6/2013 | Siman | |
| 2015/0013011 A1 * | 1/2015 | Brucker et al. | 726/25 |

OTHER PUBLICATIONS

Zhenmin et al, "PR-Miner: Automatically Extracting Implicit Programming Rules and Detecting Violations in Large Software Code", ACM Sigsoft Software Engineering Notes, vol. 30, No. 5, pp. 306-315, Sep. 1, 2005.

Thummalapenta et al, "Alattin: Mining Alternative Patterns for detecting Neglected Conditions", 24th IEEE/ACM International Conference on IEEE Automated Software Engineering, pp. 283-294, Nov. 16, 2009.

Kim et al, "Supporting software development through declaratively codified programming patterns", Expert Systems with Applications, vol. 23, No. 4, pp. 405-413, Nov. 1, 2002.

U.S. Appl. No. 12/443,824 office action dated Aug. 22, 2013.

U.S. Appl. No. 13/772,377 office action dated Sep. 25, 2013.

Skedzielewski et al., "Data flow graph optimization in IF1", Functional programming languages and computer architecture (book), publisher Springer Berlin Heidelberg, pp. 17-34, year 1985.

SAP, Java web application security best practice guide, SAP,Document version 2.0, pp. 1-48, May 2006.

Siman, M., International Application PCT/IB2013/058741 filed Sep. 22, 2013.

International Application PCT/IL2007/001233 Search Report dated Aug. 27, 2008.

Sreedhar et al., "A New Framework for Elimination-Based Data Flow Analysis Using DJ Graphs", ACM Transactions on Programming Languages and Systems, vol. 20, No. 2, pp. 368-407, Mar. 1998.

Helmer et al., "A Software Fault Tree Approach to Requirements Analysis of an Intrusion Detection System", 1st Symposium on Requirements Engineering for Information Security, Indianapolis, Indiana, USA, Mar. 5-6, 2001.

Redgate, ".NET Reflector: Explore, Browse, and Analyze .NET assemblies", 2009 (www.red-gate.com/productors/reflector).

European Patent Application # 07827207.7 Search Report dated Sep. 29, 2011.

Srikant et al., "Mining Sequential Patterns: Generalizations and Performance Improvements", EDBT '96 Proceedings of the 5th International Conference on Extending Database Technology: Advances in Database Technology, pp. 3-17, Avignon, France, Mar. 25-29, 1996.

Zaki, M., "SPADE: An Efficient Algorithm for Mining Frequent Sequences", Machine Learning, vol. 42, pp. 31-60, year 2001.

Pei et al., in "Mining Sequential Patterns by Pattern-Growth: The PrefixSpan Approach," IEEE Transactions on Knowledge and Data Engineering, vol. 16, No. 10, pp. 1424-1440, Oct. 2004.

Martin et al., "Finding Application Errors and Security Flaws Using PQL: a Program Query Language", OOPSLA'05, pp. 365-383, San Diego, USA, Oct. 16-20, 2005.

Yang et al., "Effective Sequential Pattern Mining Algorithms for Dense Database", National Data Engineering Workshops (DEWS), year 2006.

Ayres et al., "Sequential Pattern Mining using A Bitmap Representation", Proceedings of the eighth ACM SIGKDD international conference on Knowledge discovery and data mining, Edmonton, Canada, Jul. 23-26, 2002.

Wang et al., "BIDE: Efficient Mining of Frequent Closed Sequence", Proceedings of 2010 International Conference on Information Retrieval & Knowledge Management, pp. 270-275, Sham Alam, Selangor, Mar. 17-18, 2010.

Yan et al., "CloSpan: Mining Closed Sequential Patterns in Large Datasets", Proceedings of 2003 SIAM International Conference on Data Mining, San Francisco, USA, May 1-3, 2003.

Japanese Patent Application # 2009532956 Official Action dated Mar. 21, 2012.

International Application PCT/IB2011/053671 Search Report dated Jan. 9, 2012.

U.S. Appl. No. 12/443,824 Official Action dated Dec. 19, 2012.

U.S. Appl. No. 12/443,824 Official Action dated Apr. 6, 2012.

U.S. Appl. No. 12/443,824 Official Action dated Oct. 11, 2011.

Lange et al., "Comparing Graph-based Program Comprehension Tools to Relational Database-based Tools", IEEE 0-7695-1131-7/01, pp. 209-218, year 2001.

Beyer et al., "The BLAST Query Language for Software Verification", Springer-Verlag Berlin Heidelberg, pp. 2-18, year 2004.

Pingali et al., "Optimal Control Dependence Computation and the Roman Chariots Problem", ACM Transactions on Programming Languages and Systems, vol. 19, No. 3, pp. 462-485, May 1997.

Siman, M., U.S. Appl. No. 61/705,157, filed Sep. 25, 2012.

Ford et al., "Analyzing and Detecting Malicious Flash Advertisements", Proceedings of ACSAC '09—Annual Computer Security Applications Conference, pp. 363-372, Honolulu, Hawaii, Dec. 7-11, 2009.

"Design flaw in AS3 socket handling allows port probing", 2 pages, Oct. 15, 2008 (downloaded from http://scan.flashsec.org/).

Symantec Corporation, "Symantec Ad Vantage: Dynamic Anti-Malvertising Solution", Data Sheet, 4 pages, year 2012.

"Zero-day attack", 4 pages, year 2008 (downloaded from http://en.wikipedia.org/wiki/Zero-day_attack).

Ashish et al., "Network Intrusion Detection Sequence mining—stide methodology", IT 608, Data Mining and Warehousing, Indian Institute of Technology, 8 pages, Apr. 20, 2005.

Ford et al., "Analyzing and Detecting Malicious Flash Advertisements", ACSAC Proceedings of the 2009 Annual Computer Security Applications Conference, pp. 363-372 , 2009.

Yamada et al., "A defect Detection Method for Object-Oriented Programs using Sequential Pattern Mining", vol. 2009-CSEC-45, pp. 1-8, Jun. 15, 2009.

(56) References Cited

OTHER PUBLICATIONS

JP Patent Application # 2013-525394 Office Action dated Jun. 3, 2015.

Yamada et al., "A defect Detection Method for Object-Oriented Programs using Sequential Pattern Mining", Information Processing Society of Japan (IPSJ) SIG Technical Report, vol. 2009-CSEC-45, pp. 1-8, Jun. 15, 2009.

* cited by examiner

Code
```
Class Item {
    Rect GetBounds();
    void Deactivate();
}
Class Rect{
    Bool Contains (Point)
};
Point GetCurserPosition();
void WriteError();

Int Func(){
Item item;
    If(item.Getbounds().Contains(GetCursrPos())){
       item.Deactivate()
    };
    else{
       WriteError();
    }
}
```
70

Sequence
```
F-Func():int
Item
Rect=Item.GetBounds():Rect
Point=GetCurserPos():Point
Bool=Rect Contains(Point):Bool
Bool==TRUE
IF
Item.Deactivate():void
ELSE
WriteError():void
END-IF
```
72

FIG. 5

MINING SOURCE CODE FOR VIOLATIONS OF PROGRAMMING RULES

CROSS-REFERENCE TO RELATED APPLICATIONS

This application claims the benefit of U.S. Provisional Patent Application 61/376,260, filed Aug. 24, 2010, which is incorporated herein by reference.

FIELD OF THE INVENTION

The present invention relates generally to computer software, and particularly to automatic detection of security breaches in computer software.

BACKGROUND

Application-level software code is prone to security vulnerabilities: Sections of the code, when executed, may allow external inputs to cause improper or undesired behavior, which can compromise data privacy and proper system operation. Examples of vulnerabilities include buffer overflow, race conditions, and privilege escalation. Such vulnerabilities may be introduced intentionally by programmers or accidentally, due to improper programming practice.

Methods for detection of software vulnerabilities are known in the art. For example, U.S. Patent Application Publication 2010/0083240, whose disclosure is incorporated herein by reference, describes a tool that automatically analyzes source code for application-level vulnerabilities. Operation of the tool is based on static analysis, but it makes use of a variety of techniques, for example methods of dealing with obfuscated code.

Sequence mining is a type of structured data mining that is concerned with finding statistically relevant patterns in data examples in which values occur in sequence. It may be applied both to strings of symbols and to ordered sequences of items (such as words, phrases, tags, or events).

A variety of sequence mining algorithms are known in the art. For example, the popular GSP algorithm is described by Srikant and Agrawal in "Mining Sequential Patterns: Generalizations and Performance Improvements," EDBT '96 Proceedings of the 5th International Conference on Extending Database Technology: Advances in Database Technology (Springer-Verlag, 1996), pages 3-17, which is incorporated herein by reference. Another algorithm, known as SPADE, is described by Zaki in "SPADE: An Efficient Algorithm for Mining Frequent Sequences,"Machine Learning 42 (2001), pages 31-60, which is also incorporated herein by reference. Yet another examiner is PrefixSpan, which is described by Pei et al., in " Mining Sequential Patterns by Pattern-Growth: The PrefixSpan Approach," IEEE Transactions on Knowledge and Data Engineering 16:10 (2004), pages 1424-1440, which is also incorporated herein by reference. Further algorithms are referenced in the above-mentioned provisional patent application.

SUMMARY

Embodiments of the present invention that are described hereinbelow apply sequence mining techniques in order to find patterns in software source code that may be indicative of vulnerabilities.

There is therefore provided, in accordance with an embodiment of the present invention, a method for software code analysis, which includes automatically processing a body of software source code by a computer in order to identify a group of sequences of instructions that are characterized by a common pattern. A sequence is found within the group containing a deviation from a norm of the common pattern. The deviation is reported as a potential vulnerability in the software source code.

In a disclosed embodiment, processing the body of the software code includes creating a document object model (DOM) of the code, and applying the DOM in identifying the sequences.

In some embodiments, processing the body of the software code includes normalizing the code, and identifying the sequences in the normalized code. Typically, normalizing the code includes finding in the code names of entities of a given type, and replacing the names appearing in the code with an indicator of the type. The entities whose names are replaced with the indicator of the type may be variables and/or constants. Additionally or alternatively, when the code is written in an object-oriented language, the entities whose names are replaced may be classes and/or members.

Further additionally or alternatively, normalizing the code may include finding in the code control blocks of a given type, each control block containing lines of the code, and replacing the lines of the code with a series of tags corresponding to the lines of the code in a format that is predefined for the type of the control block.

In disclosed embodiments, processing the body of the software code includes converting the code into a series of tags, and applying a sequence mining algorithm to identify the sequences in the group that occur within the series of the tags.

Typically, the group of the sequences is a stochastic group, which is characterized by the norm and by a distribution of respective distances of the sequences from the norm, and finding the sequence containing the deviation includes finding one or more of the sequences whose respective distances from the norm are beyond a predefined threshold.

The deviation in the sequence may include, for example, a missing operation in the software code, a failure to check a permission to perform a sensitive operation, a failure to follow a prescribed invocation sequence, a backdoor left in the code, or an error in business logic that is implemented in the code.

There is also provided, in accordance with an embodiment of the present invention, apparatus for software code analysis, including a memory, which is configured to store a body of software source code, and a processor, which is configured to automatically process the software source code in order to identify a group of sequences of instructions that are characterized by a common pattern. The processor is configured to find a sequence within the group containing a deviation from a norm of the common pattern, and to report the deviation as a potential vulnerability in the software source code.

There is additionally provided, in accordance with an embodiment of the present invention, a computer software product, including a computer-readable medium in which program instructions are stored, which instructions, when read by a computer, cause the computer to process a body of software source code in order to identify a group of sequences of instructions that are characterized by a common pattern, to find a sequence within the group containing a deviation from a norm of the common pattern, and to report the deviation as a potential vulnerability in the software source code.

The present invention will be more fully understood from the following detailed description of the embodiments thereof, taken together with the drawings in which:

BRIEF DESCRIPTION OF THE DRAWINGS

FIG. 5 is a table that schematically illustrates a method for transforming a code segment into a sequence of tags with normalized member names, in accordance with an embodiment of the present invention.

DETAILED DESCRIPTION OF EMBODIMENTS

Overview

Figure 1:
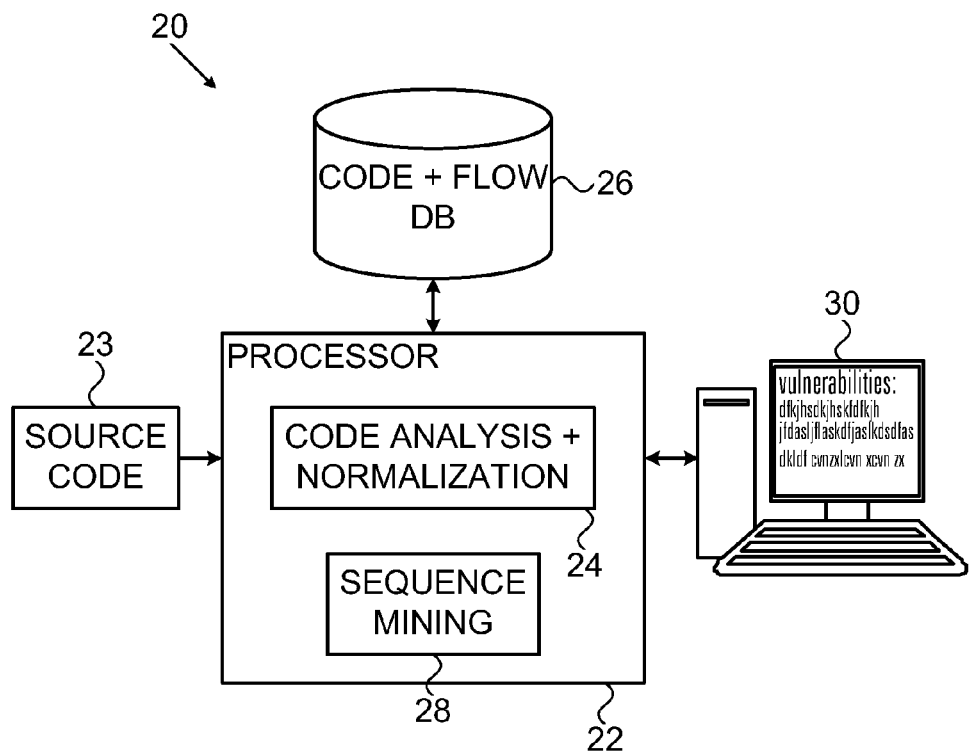
FIG. 1 is a block diagram that schematically illustrates a system for source code analysis, in accordance with an embodiment of the present invention.

Certain software analysis tools that are known in the art, such as those described in the above-mentioned U.S. Patent Application Publication 2010/0083240, extract and analyze the structure and flow of software code in a manner that enables a user to conveniently search for and identify security breaches. These tools assume, however, that the user knows what to look for, i.e., that problematic patterns of structure and flow can be defined in advance and then searched for in the code structure.

Embodiments of the present invention that are described hereinbelow overcome this limitation by finding potentially-problematic patterns in the code automatically, without requiring a priori definition or even knowledge of the patterns. The disclosed methods use sequence mining tools that are known in the art but have not been applied in the past to analysis of computer software. Generally speaking, sequence mining works best on sequences of symbols or tags that are drawn from a limited alphabet or constellation and are organized in a uniform format. Therefore, in the embodiments disclosed below, the software code is normalized—converted into a corresponding sequence of tags of predefined form—before sequence mining is applied. In the context of the present patent application and in the claims, the term "tag" means a textual label.

In the embodiments that are described hereinbelow, a computer automatically processes a body of software source code using sequence mining to identify one or more groups of sequences of instructions that are characterized by respective common patterns. The patterns need not be defined in advance, but rather may be identified based on the statistical properties of the code (or specifically of the corresponding tag sequence). A group of sequences identified by this sequence mining is typically a stochastic group, meaning that the sequences in the group are statistically similar but not identical. Such a group may be characterized by a norm, corresponding generally to the average pattern in the group, and by a distribution of respective distances of the sequences from the norm. "Distance" in this context typically means an edit distance, such as the Levenshtein distance, corresponding to the number of differences (such as insertions, deletions, and replacements) between the tags in a given sequence and the norm.

To identify possible vulnerabilities, the computer finds sequences in the group that deviate significantly from the norm, i.e., sequences whose respective distances from the norm are beyond a certain threshold (which may be set by the user). These deviations are sometimes indicative of vulnerabilities, such as a failure to carry out the appropriate permission check before performing a sensitive operation; failure to follow a prescribed invocation sequence; backdoors left in the code by a programmer; or errors in business logic that is implemented in the code. The computer reports deviations from the norm of the group as potential vulnerabilities in the software source code.

In some embodiments of the present invention, the normalization process includes "smoothing" certain types of differences between sequences in the code, i.e., substituting a common term or structure for many variants of the same type of term or structure that occur in the code. This process generalizes the code, so that similar sequences become more nearly identical and can then be identified by sequence mining. The level of generalization is chosen so as to facilitate finding meaningful groups of sequences without masking differences that could be indicative of vulnerabilities. The inventor has found, for example, that effective normalization can be performed by finding names of entities of a given type, such as variables, constants, classes and/or members, and replacing the names appearing in the code with an indicator of the type. Additionally or alternatively, the lines of code in control blocks may be replaced with a series of tags in a format that is predefined for the type of the control block.

Although the embodiments that are described herein refer, for the sake of illustration, to certain particular normalization techniques, other applicable code normalization techniques will be apparent to those skilled in the art upon reading the present patent application and are considered to be within the scope of the present invention. The appropriate choice of normalization techniques and of sequence mapping algorithms depends on the nature of the code under analysis and the vulnerabilities of concern, which can be determined by the skilled user in each case on the basis of the present disclosure.

System and Method Description

Figure 2:
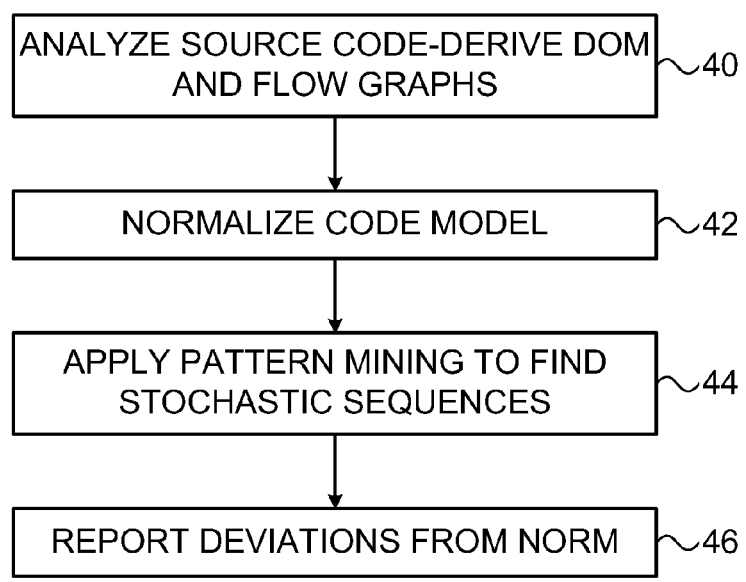
FIG. 2 is a flow chart that schematically illustrates a method for source code analysis, in accordance with an embodiment of the present invention.

References is now made to FIGS. 1 and 2, which schematically illustrate a system 20 and method for source code analysis, in accordance with an embodiment of the present invention. FIG. 1 is a block diagram of the system, while FIG. 2 is a flow chart presenting key steps in the method. The elements of system 20 are similar to those of the source code analysis system that is described in the above-mentioned U.S. Patent Application Publication 2010/0083240, with the addition of the sequence mining-related capabilities that are described in the present patent application. For the sake of brevity, therefore, only these added capabilities will be described here.

System 20 comprises a processor 22, typically embodied in a general-purpose or special-purpose computer, which is programmed in software to carry out the functions that are described herein. The software may be downloaded to processor 22 in electronic form, over a network, for example. Additionally or alternatively, the software may be provided and/or stored on tangible, non-transitory computer-readable media, such as magnetic, optical, or electronic memory. Further additionally or alternatively, at least some of the functions of processor 22 may be carried out by suitable programmable logic circuits.

Processor 22 receives a body of source code 23 for analysis. The processor activates a code analysis and normalization module 24 (typically implemented as a software module) to pre-process the code in preparation for sequence mining. Module 24 typically derives a document object model (DOM) and flow graphs of the code, at a code analysis step 40. The flow graphs may include a data flow graph (DFG), a control flow graph (CFG), and a control dependence graph (CDG). Derivation of the DOM and these graphs is described, for example, in U.S. Patent Application Publication 2010/0083240. Processor 22 stores the analysis results in a memory 26, typically in the form of a database to enable convenient access to the data thereafter.

Listing I in Appendix A below presents a source code listing of a simple function, which is used in illustrating DOM construction and subsequent normalization, in accordance with an embodiment of the present invention. The resulting DOM is presented in Listing II in Appendix A. The remaining listings show successive stages in normalization of the DOM, as explained below.

Module 24 normalizes the source code, at a normalization step 42. The normalization may be applied to the code itself or to the DOM (or both); and for the sake of simplicity and completeness, all of these forms of normalization are referred to herein as code normalization, and the term "normalized code" refers the normalized form of the source code itself or of any derivative of the source code, including the DOM. Optionally, elements of the flow graphs may be normalized for sequence mining, as well.

A sequence mining module 28 scans over the normalized code to find stochastic sequence patterns, at a sequence mining step 44. Module 28 may use any suitable sequence mining algorithm or combination of algorithms that is known in the art. Examples of such algorithms include the GSP, SPADE and PrefixSpan algorithms that are mentioned in the Background section above, as well as SPAM, LAPIN, CloSpan and BIDE. (Java™ code implementing a number of these algorithms is available for download from the SPMF Web site.) Typically at step 44, module 28 processes the normalized DOM that was created in steps 40 and 42. Alternatively or additionally, module 28 may process the source code and/or one or more of the flow graphs.

Sequence mining module 28 identifies groups of sequences of instructions that are characterized by common patterns. Users of system 20 may typically set the radius of the groups that module is to find, i.e., the maximum difference (using appropriate distance measures) between members of a given group. Within each such group, module 28 may find one or more sequences that deviate from the norm of the common pattern in the group by more than a given threshold, which may likewise be set by the user. Appendix B below presents further details and an example of sequence mining techniques that may be used in this context.

Module 28 reports these deviations via an output device 30, such as a data display, at a reporting step 46. The report may simply comprise an identification of the code segments that are suspected as potential vulnerabilities in the source code, leaving the job of understanding and repairing the vulnerabilities to the user of system 20. Additionally or alternatively, module 28 may analyze the deviant patterns further in order to point out the specific flaws in the deviant sequences.

Implementation Details and Examples

Normalization step 42 typically includes a number of different operations on the code. For example, names, values, assignments and conditions in the code may be normalized as follows:

Local variables names are replaced by their types.
Constants are labeled generically as CONST with type information.
Assignments are moved out of function calls.
Method calls are moved out of assignments, conditions and other control commands. (See, for example, the tag "Rect=Iem.GetBounds( ):Rect" in sequence 72, FIG. 5).
Relational operators are normalized, for example:
  Change a<b to b>=a
  Change a<=b to b>a
  Change not a==True to a==False
  Change not a==False to a==True Listing III in Appendix A shows the DOM of Listing II after application of the first two normalization operations above.

As another part of the normalization process, control statements in the code are recast in a format that is predefined for each type of control block, so that each control block is represented as a sequence of tags with a consistent format. For example, if statements of the form:
  if (<cond>) <then> else <else>;
can be recast as tag sequences in the following format:
  <cond>, IF, <then>, ELSE, <else>, END-IF
(as illustrated by the sequence of tags "IF . . . ELSE . . . END-IF" within sequence 72 in FIG. 5).

Figure 3:
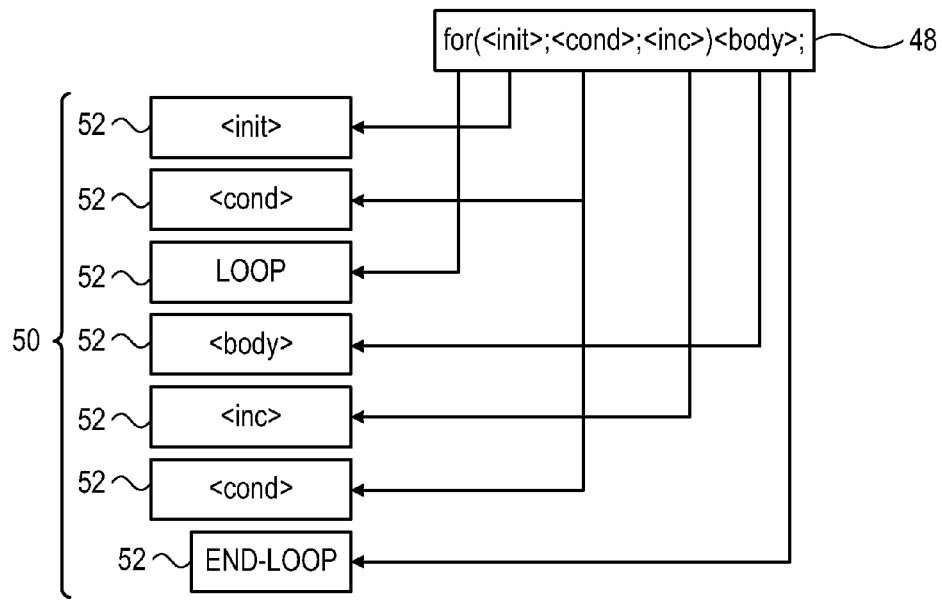
FIG. 3 is a block diagram that schematically illustrates a method for transforming a control statement into a sequence of tags, in accordance with an embodiment of the present invention.

As another example, FIG. 3 is a block diagram that schematically illustrates a method for transforming a for control statement 48 into a sequence 50 of tags 52, in accordance with an embodiment of the present invention. In the pictured example, statement 48:
  for (<init>; <cond>; <inc>) <body>;
is recast as the corresponding tag sequence 50:
  <init>, <cond>, LOOP, <body>, <inc>, <cond>, END-LOOP.

Figure 4:
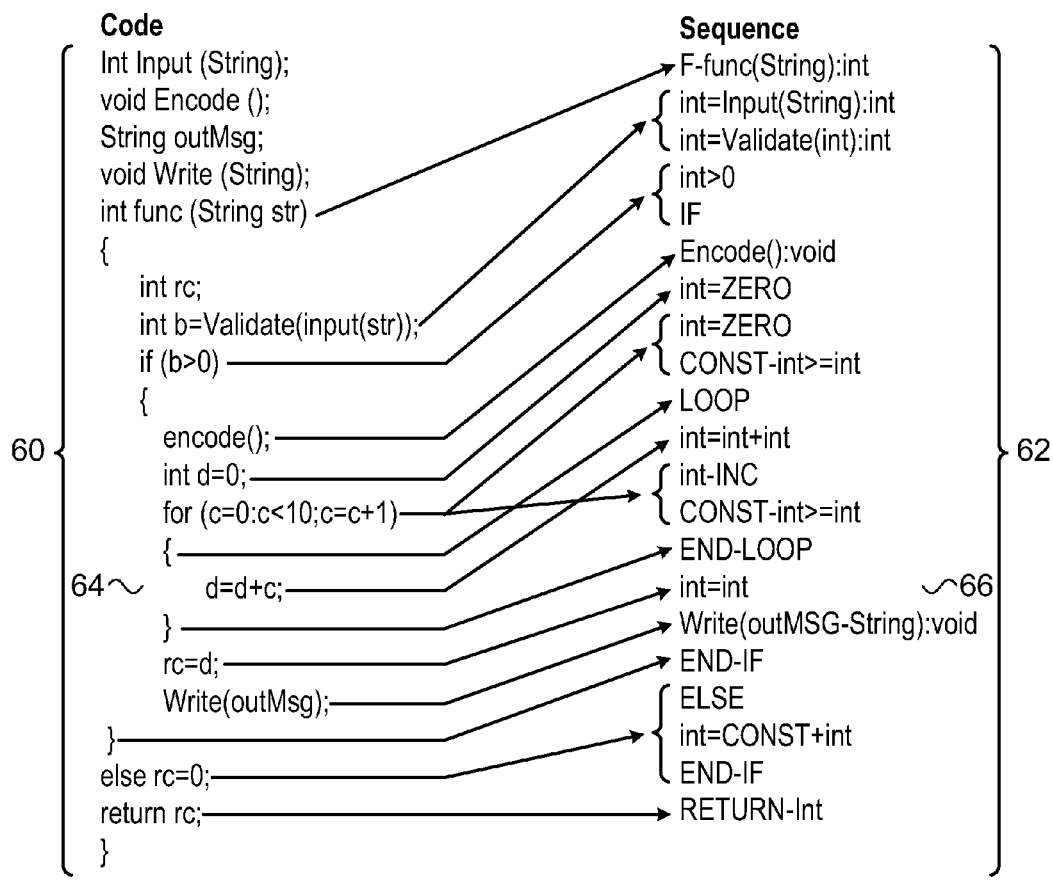
FIG. 4 is a table that schematically illustrates a method for transforming a code segment into a sequence of tags, in accordance with an embodiment of the present invention.

FIG. 4 is a table that schematically illustrates a method for transforming a code segment 60 into a sequence 62 of tags, in accordance with another embodiment of the present invention. Arrows in the figure show the correspondence between lines of code and the tags that replace them following normalization. In particular, segment 60 contains a while loop 64, of the general form while (<cond>) <body>. Loop 64 is recast as a subsequence 66 of tags, having the form:
  <cond>, LOOP, <body>, <cond>, END-LOOP.
Sequence 62 also illustrates normalization of an if statement and conversion of names and constants to types, as described above. For instance, the variable expression "int d=0" in segment 60 is converted into the tag "int=ZERO" in sequence 62.

Although the examples shown in the figures illustrate normalization of actual source code, in practice these normalization techniques may typically be applied to the DOM that is created from the source code. Converting control blocks into tag sequences has the effect of flattening the initial hierarchical structure of the DOM. Listing IV shows the effect of applying this sort of flattening to the control statements in the DOM of Listings II and III.

FIG. 5 is a table that schematically illustrates a method for transforming a code segment 70 into a sequence 72 of tags with normalized class and member names, in accordance with another embodiment of the present invention. This sort of normalization is applicable particularly for normalization of code that is written in an object-oriented programming language. The listing incidentally illustrates flattening of an if statement.

The normalization rules (some of which are illustrated in FIG. 5) for class names may include:

- Globally-defined (public) classes are used by name (for example, "Item.GetBound . . . " in sequence 72).
- Public and protected inner classes are used by name. Names of private inner classes are normally replaced by the tags CLASS and MEMBER.
- Names of method-local classes are replaced by the tags CLASS and MEMBER.
- Members of private inner classes (regardless of their visibility) are treated as private members of the corresponding outer classes.

The normalization rules for member names (also illustrated in FIG. 5) may include:

- Public member names are replaced by their names attached to respective type information (as illustrated, for example, by the tag "Rect=Item.GetBounds( ):Rect").
- Protected member names may be replaced by their names attached to respective type information.
- Names of private members, are replaced by the CLASS and MEMBER tags, with respective type information.
- In cases of polymorphism of a given name, the base type may be used in order to generalize across all heirs.

Once the above normalization steps have been performed on the DOM derived from the software source code, the DOM is effectively flattened into a sequence of tags, in place of its original hierarchical, functional structure. Listing V in Appendix A shows this sort of fully-flattened DOM.

The inventor has found sequence mining on a normalized DOM to be effective in detecting a variety of code vulnerabilities, including (but not limited to) the following examples:

Missing operations (e.g., catch block logging)
  Catch blocks (commonly used for exception handling in Java™) usually include a certain logging operation. Sometimes developers forget to use the logging operation. Sequence mining will identify the normal sequence of tags: Try→SensitiveOperation→Catch→Log, and may thus find sequences in the code that break this rule.

Functions that require a condition test (e.g., user authentication)
  Often, sensitive operations should be called only after the user has been authenticated or presented a specific permission. Sequence mining may identify the normal sequence: IfUserIsAuthenticated→DoSensitiveOperation, and may thus find sequences in which the "Sensitive Operation" is called without prior checking of the user's permission.

Common invocation sequences (which are sometimes broken)
  XSS (cross-site scripting) vulnerabilities in Web sites allow hackers to inject malicious client-side scripts into Web pages viewed by other users. To mitigate this problem, it is common to call helper functions (such as HTMLEncode in .NET environments) to "fix" strings that are input by a user before responding to the user. Sequence mining can be used to learn the proper pattern of calling the helper function in the correct order and to identify deviations from this order.

Backdoors
  Programmers often put backdoors in code in locations at which user permissions are checked. For example, the statement: If (UserIsAdministrator or Username="Maty SIMAN") could be used to create a backdoor for the programmer Maty Siman. Sequence mining can be used to learn the proper permission sequence and identify deviations that occur when a backdoor is left in the code.

Missing business logic
  Business processes often require verification that parameters are in the proper range before taking action on the parameters. For instance, before charging a customer for a purchase of certain goods at a certain price, it should be verified that the price and the quantity of the goods are positive numbers (since otherwise the customer may be credited, rather than charged). Sequence mining can learn the pattern of normal sale operations that includes the parameter verification function, and then identify cases in which the proper verification was not invoked.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX A

SAMPLE CODE LISTINGS

LISTING I - RAW SOURCE CODE

```
int func(string str){
    int b=validate( );
    encode( );
    if (b>3)
    {
        for (c=0;c<10;++c)
        {
            d=d+c;
        }
    }
}
```

LISTING II - CODE COVERTED TO DOM

```
MethodDecl, func
    ParamDecl, str
        Type, String
    AssignExpr
        Left
            Variable, b
        Right
            MethodInvoke, validate
    MethodInvoke, encode
    IfStmt
        Condition
            BinaryOperator, >
                Left
                    variable, b
                Right
                    IntergerLiteral, 3
        Statements
            ForStmt
                InitStmt
                    Left
                        Variable, c
                    Right
                        IntergerLiteral, 0
                ConditionStmt
                    BinaryOperator, <
                        Left
                            Variable, c
                        Right
                            IntergerLiteral, 10
```

APPENDIX A-continued

SAMPLE CODE LISTINGS

```
            IterationStmt
                UnaryOperator, ++
                    Operand
                        Variable, c
                Statements
                    AssignExpr
                        Left
                            Variable, d
                        Right
                            Addition, +
                                Left
                                    Variable, d
                                Right
                                    Variable, c
```

LISTING III - VARIABLE NAMES CONVERTED TO TYPES

```
MethodDecl, func
    ParamDecl, str
        Type, String
    AssignExpr
        Left
            Variable, INT
        Right
            MethodInvoke, validate
    MethodInvoke, encode
    IfStmt
        Condition
            BinaryOperator, >
                Left
                    variable, INT
                Right
                    IntergerLiteral, CONST-Int
        Statements
            ForStmt
                InitStmt
                    Left
                        Variable, INT
                    Right
                        IntegerLiteral, ZERO
                ConditionStmt
                    BinaryOperator, <
                        Left
                            Variable, INT
                        Right
                            IntegerLiteral, CONST-Int
                IterationStmt
                    UnaryOperator, ++
                        Operand
                            Variable, INT
                Statements
                    AssignExpr
                        Left
                            variable, INT
                        Right
                            Addition, +
                                Left
                                    Variable, INT
                                Right
                                    Variable, INT
```

LISTING IV - FLATTEN CONTROL STATEMENTS

```
MethodDecl, func
    ParamDecl, str
        Type, String
    AssignExpr
        Left
            Variable, INT
        Right
            MethodInvoke, validate
    MethodInvoke, encode
    Condition
        BinaryOperator, >
            Left
                variable, INT
            Right
                IntergerLiteral, , CONST-Int
    IfStmt
    Statements
        InitStmt
            Left
                Variable, INT
            Right
                IntegerLiteral, ZERO
        ConditionStmt
            BinaryOperator, <
                Left
                    Variable, INT
                Right
                    IntergerLiteral, , CONST-Int
        LOOP
        Statements
            AssignExpr
                Left
                    variable, INT
                Right
                    Addition, +
                        Left
                            Variable, INT
                        Right
                            Variable, INT
        IterationStmt
            UnaryOperator, ++
                Operand
                    Variable, INT
        ConditionStmt
            BinaryOperator, <
                Left
                    Variable, INT
                Right
                    IntergerLiteral, , CONST-Int
        END LOOP
```

LISTING V - DOM TREE FLATTENED INTO ARRAY

```
MethodDecl, func
ParamDecl, str
Type, String
AssignExpr
Variable, INT
MethodInvoke, validate
MethodInvoke, encode
Condition
BinaryOperator, >
Left
variable, INT
Right
IntergerLiteral, , CONST-Int
IfStmt
Statements
InitStmt
Left
Variable, INT
Right
IntegerLiteral, ZERO
ConditionStmt
BinaryOperator, <
Left
Variable, INT
Right
IntergerLiteral, , CONST-Int
LOOP
Statements
AssignExpr
Left
variable, INT
Right
Addition, +
Left
Variable, INT
Right
Variable, INT
IterationStmt
UnaryOperator, ++
Operand
Variable, INT
ConditionStmt
BinaryOperator, <
```

APPENDIX A-continued

SAMPLE CODE LISTINGS

```
   Left
     Variable, INT
   Right
     IntergerLiteral, , CONST-Int
END LOOP
```

Appendix B—Sequence Mining Details and Example

As a preliminary to sequence mining of a tag sequence derived from software code, the operator of system 20 defines three "constants" (parameter values):

A. The "support" value—the minimum number of appearances to be considered as a "common" sequence.

B. "Minimal length"—the shortest acceptable sequence (otherwise, for example, many single item sequences will be considered as "common").

C. "Confidence"—The confidence of (X→Y) means: if we meet a subsequence X, what is the probability we meet Y. For example, if we meet the string "abcdefg", it is very probable it will be followed by "hij"—hence the confidence is high (for the sake of example, say 50%).

In the following example, we set the support level to be 60, minimum-length three, and confidence 50%.

Suppose a body of code contains the sequences listed in the table below: The code sequence "f1( ); f2( ); f3( );" appears 80 times in the code; the sequence "f1( ); f4( ); f2( ); f3( );" appears 20 times; and so forth:

|  | Times |  |  |  |
|---|---|---|---|---|
|  | 80 | 20 | 1 | 50 |
| Sequence | f1( )<br>f2( )<br>f3( ) | f1( )<br>f4( )<br>f2( )<br>f3( ) | f1( )<br>f5( )<br>f3( ) | f2( )<br>f6( )<br>f3( ) |

To process these sequences, sequence mining module 28 first finds the number of times each (sub)sequence appear. The module may start with single-item sequences:

|  | Times |  |  |  |  |  |
|---|---|---|---|---|---|---|
|  | 101 | 150 | 151 | 20 | 1 | 50 |
| Sub-Sequence | f1( ) | f2( ) | f3( ) | f4( ) | f5( ) | f6( ) |

According to the "a-priori" rule, a sequence cannot appear more times than any of its sub-sequences. (For example, a sequence that contains F5( ) cannot appear more times than F5( ) itself) Thus, module 28 can eliminate all sub-sequences that do not meet our defined support level (60), leaving the following:

|  | Times |  |  |
|---|---|---|---|
|  | 101 | 150 | 151 |
| Sub-Sequence | f1( ) | f2( ) | f3( ) |

Now, module 28 builds all possible two-items sequences based on the above items. In this context:

A. Order does matter.

B. The two items do not have to be adjacent.

|  | Times |  |  |  |  |  |
|---|---|---|---|---|---|---|
|  | 100<br>(80 + 20) | 101 | 0 | 150<br>(80 + 20 + 50) | 0 | 0 |
| Sub-Sequence | f1( )<br>f2( ) | f1( )<br>f3( ) | f2( )<br>f1( ) | f2( )<br>f3( ) | f3( )<br>f1( ) | f3( )<br>f2( ) |

Removing zeros, module 28 is left with:

|  | Times |  |  |
|---|---|---|---|
|  | 100<br>(80 + 20) | 101 | 150<br>(80 + 20 + 50) |
| Sub-Sequence | f1( )<br>f2( ) | f1( )<br>f3( ) | f2( )<br>f3( ) |

Since we defined the minimum-length as 3, and our sequences so far are only of length 2, module 28 repeats the sequence-building step again to obtain:

|  | Times |  |  |
|---|---|---|---|
|  | 100 | 0 | 0 |
| Sub-Sequence | f1( )<br>f2( )<br>f3( ) | f1( )<br>f3( )<br>f2( ) | f2( )<br>f3( )<br>f1( ) |

Thus, the only common sequence that meets both the support and minimal length criteria is f1( ), f2( ), f3( ).

Returning now to the original table, module 28 filters instances of the common sequence f1( ), f2( ), f3( ) whose confidence is lower than the preset value:

|  | Times |  |  |  |
|---|---|---|---|---|
|  | 80 | 20 | 1 | 50 |
| Sequence | f1( )<br>f2( )<br>f3( ) | f1( )<br>f4( )<br>f2( )<br>f3( ) | f1( )<br>f5( )<br>f3( ) | f2( )<br>f6( )<br>f3( ) |

Out of the 100 occurrences of the sequence (f1-f2-f3), 20% have f4 between the first two items, while 80% do not. Therefore, the sequence f1-f4-f2-f3 contains a common-sequence, but does not meet the confidence level we defined. Consequently, module 28 will identify this latter sequence as a deviation, which may be indicative of a vulnerability in the software code.

The invention claimed is:

1. A method for software code analysis, comprising:
   automatically normalizing a body of software source code by a computer, so as to generate a flow graph of the code, wherein the flow graph includes a sequence of tags representing instructions in the software code;
   applying a sequence mining method to the flow graph of the code in order to identify a group of a plurality of sub-sequences in the sequence of tags of the flow graph, which sub-sequences are similar to each other;

determining for the identified group of sub-sequences, a common norm pattern;

finding a sub-sequence within the group deviating from the common norm pattern, by an extent beyond a threshold; and reporting the deviating sub-sequence as a potential vulnerability in the software source code, wherein the tags in the sub-sequences have the same order as in the sequence, but adjacent tags in the sub-sequences are not necessarily adjacent in the sequence.

2. The method according to claim 1, wherein normalizing the body of the software code comprises creating a document object model (DOM) of the code.

3. The method according to claim 1, wherein normalizing the code comprises finding in the code names of entities of a given type, and replacing the names appearing in the code with an indicator of the type.

4. The method according to claim 3, wherein the entities whose names are replaced with the indicator of the type are selected from a group of the entities consisting of variables and constants.

5. The method according to claim 3, wherein the code is written in an object-oriented language, and wherein the entities whose names are replaced with the indicator of the type are selected from a group of the entities consisting of classes and members.

6. The method according to claim 1, wherein normalizing the code comprises finding in the code control blocks of a given type, each control block containing lines of the code, and replacing the lines of the code with a series of tags corresponding to the lines of the code in a format that is predefined for the type of the control block.

7. The method according to claim 1, wherein the deviation in the sub-sequence comprises a missing operation in the software code.

8. The method according to claim 1, wherein the deviation in the sub-sequence comprises a failure to check a permission to perform a sensitive operation.

9. The method according to claim 1, wherein the deviation in the sub-sequence comprises a failure to follow a prescribed invocation sequence.

10. The method according to claim 1, wherein the deviation in the sub-sequence is associated with a backdoor left in the code.

11. The method according to claim 1, wherein the deviation in the sub-sequence comprises an error in business logic that is implemented in the code.

12. The method according to claim 1, wherein applying the sequence mining method comprises identifying a stochastic group of sub-sequences of instructions having a maximum difference not greater than a user set radius.

13. The method according to claim 1, wherein applying the sequence mining method comprises applying GSP, SPADE or PrefixSpan.

14. The method according to claim 1, comprising receiving a user setting of the threshold, and wherein finding the sub-sequence within the group deviating from the common norm pattern comprises finding a sub-sequence deviating from the common norm pattern, by an extent beyond the user setting of the threshold.

15. Apparatus for software code analysis, comprising:
a memory, which is configured to store a body of software source code; and
a processor, which is configured to automatically normalize the software source code, so as to generate a flow graph of the code, wherein the flow graph includes a sequence of tags representing instructions in the software code, to apply a sequence mining method to the flow graph of the source code in order to identify a group of a plurality of sub-sequences in the sequence of tags, which sub-sequences are similar to each other, to determine for the identified group of sub-sequences a common norm pattern, to find a sub-sequence within the group containing a deviation from the common norm pattern by an extent beyond a threshold, and to report the deviation as a potential vulnerability in the software source code, wherein the tags in the sub-sequences have the same order as in the sequence, but adjacent tags in the sub-sequences are not necessarily adjacent in the sequence.

16. The apparatus according to claim 15, the processor is configured to create a document object model (DOM) of the code in normalizing the software source code.

17. The apparatus according to claim 15, wherein normalizing the code comprises finding in the code names of entities of a given type, and replacing the names appearing in the code with an indicator of the type.

18. The apparatus according to claim 17, wherein the entities whose names are replaced with the indicator of the type are selected from a group of the entities consisting of variables and constants.

19. The apparatus according to claim 17, wherein the code is written in an object-oriented language, and wherein the entities whose names are replaced with the indicator of the type are selected from a group of the entities consisting of classes and members.

20. The apparatus according to claim 15, wherein the processor is configured to normalize the code by finding in the code control blocks of a given type, each control block containing lines of the code, and replacing the lines of the code with a series of tags corresponding to the lines of the code in a format that is predefined for the type of the control block.

21. The apparatus according to claim 15, wherein the deviation in the sub-sequence comprises a missing operation in the software code.

22. The apparatus according to claim 15, wherein the deviation in the sub-sequence comprises a failure to check a permission to perform a sensitive operation.

23. The apparatus according to claim 15, wherein the deviation in the sub-sequence comprises a failure to follow a prescribed invocation sequence.

24. The apparatus according to claim 15, wherein the deviation in the sub-sequence is associated with a backdoor left in the code.

25. The apparatus according to claim 15, wherein the deviation in the sub-sequence comprises an error in business logic that is implemented in the code.

26. A computer software product, comprising a non-transitory computer-readable medium in which program instructions are stored, which instructions, when read by a computer, cause the computer to normalize a body of software source code, so as to generate a flow graph of the code, wherein the flow graph includes a sequence of tags representing instructions in the software code, to apply a sequence mining method to the flow graph of the code in order to identify a group of a plurality of sub-sequences in the sequence of tags, which sub-sequences are similar to each other, to determine for the identified group of sub-sequences a common norm pattern, to find a sub-sequence within the group containing a deviation from the common norm pattern by an extent beyond a threshold, and to report the deviation as a potential vulnerability in the software source code, wherein the tags in the sub-sequences have the same order as in the sequence, but adjacent tags in the sub-sequences are not necessarily adjacent in the sequence.

27. The product according to claim 26, the instructions cause the computer to create a document object model (DOM) of the code in normalizing the software source code.

28. The product according to claim 26, wherein normalizing the code comprises finding in the code names of entities of a given type, and replacing the names appearing in the code with an indicator of the type.

29. The product according to claim 28, wherein the entities whose names are replaced with the indicator of the type are selected from a group of the entities consisting of variables and constants.

30. The product according to claim 28, wherein the code is written in an object-oriented language, and wherein the entities whose names are replaced with the indicator of the type are selected from a group of the entities consisting of classes and members.

31. The product according to claim 26, wherein normalizing the code comprises finding in the code control blocks of a given type, each control block containing lines of the code, and replacing the lines of the code with a series of tags corresponding to the lines of the code in a format that is predefined for the type of the control block.

32. The product according to claim 26, wherein the deviation in the sub-sequence comprises a missing operation in the software code.

33. The product according to claim 26, wherein the deviation in the sub-sequence comprises a failure to check a permission to perform a sensitive operation.

34. The product according to claim 26, wherein the deviation in the sub-sequence comprises a failure to follow a prescribed invocation sequence.

35. The product according to claim 26, wherein the deviation in the sub-sequence is associated with a backdoor left in the code.

36. The product according to claim 26, wherein the deviation in the sub-sequence comprises an error in business logic that is implemented in the code.

* * * * *